March 2, 1954     E. S. PATIENCE ET AL     2,670,712

DOG HARNESS

Filed March 22, 1952

INVENTORS.
EDWIN S. PATIENCE
WARREN R. PATIENCE
BY
THEIR ATTORNEYS.

Patented Mar. 2, 1954

2,670,712

UNITED STATES PATENT OFFICE 2,670,712

DOG HARNESS

Edwin S. Patience, Hempstead, and Warren R. Patience, Franklin Square, N. Y.

Application March 22, 1952, Serial No. 277,956

3 Claims. (Cl. 54—71)

This invention relates to animal harness and it relates more particularly to harness for breaking older dogs of the habit of straining at the leash and training younger dogs not to strain at the leash. The invention constitutes an improvement over a known type of hobble or "hopple" for an animal which normally permits free movement of the animal but allows the action of the forelegs of the animal to be restricted when it attempts to run away or otherwise get out of control.

More particularly, the new harness includes a conventional dog collar and a shoulder strap which has loops at its opposite ends to receive the forelegs of the dog loosely. The shoulder strap is adjustable so that the loops can be drawn up near the shoulders of the dog, but not so tightly as to interfere normally with the movement of the dog's forelegs. However, if a strain is exerted on the shoulder strap, the loops are drawn upwardly against the forelegs so that the movement of the forelegs is restrained and the dog will be brought to a stop.

The principal feature of novelty of the individual harness is the provision of a resilient member which connects the shoulder strap with the collar so that when the leash is connected to the shoulder strap, the dog can move freely so long as he does not pull hard enough to cause the resilient member to stretch and thereby tighten the shoulder strap around the forelegs of the dog. By selecting a resilient member, such as, a heavy rubber band, elastic cord or a covered spring of suitable strength, the dog can pull against the leash enough to keep it tight without restricting the movement of the dog. If, however, the dog tries to pull harder against the leash to a degree making it uncomfortable to restrain the dog, the resilient member will stretch and thereby retard the movement of the dog.

In the absence of the resilient member, even a light strain on the leash would tighten the shoulder strap and cause the dog to stop so that it would be difficult to cause the dog to move along at all with even a slight tension on the leash.

Figure 1:
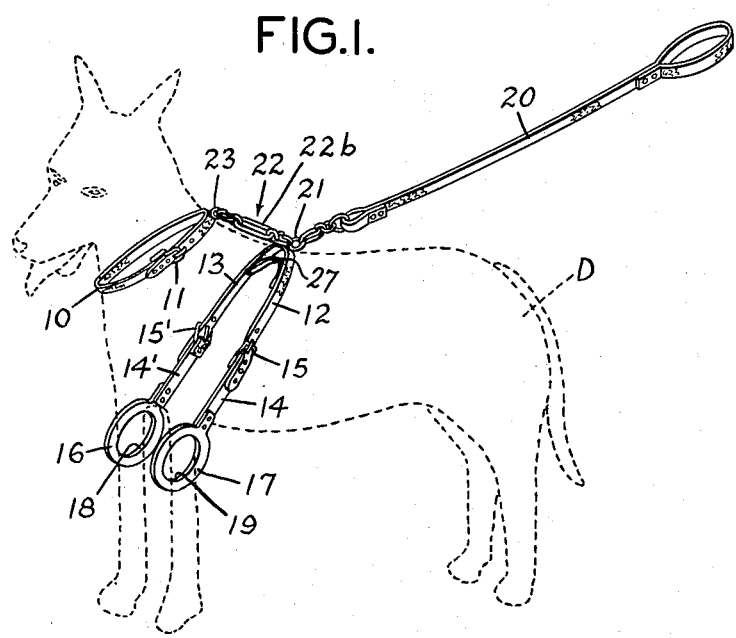
Figure 2:
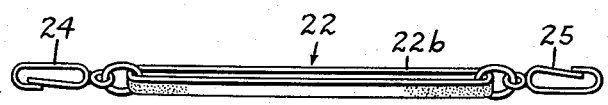

For a better understanding of the present invention, reference may be had to the accompanying drawing in which:

Fig. 1 is a perspective view of a typical form of harness embodying the present invention shown as applied to a dog which is illustrated in dotted lines; and Fig. 2 is a view in elevation of the resilient member to connect the shoulder strap of the harness to a dog collar.

As shown in Fig. 1, the harness includes a dog collar 10 of any desired type which is adjustable for size by means of a buckle 11 or the like to fit a dog D. The collar may be supplied as a part of the complete harness or the harness construction described hereinafter may be used with any type of dog collar that the dog already may have.

The harness includes a shoulder strap 12 which, as illustrated, may consist of the strap members 13, 14 and 14' which are connected by means of buckles 15 and 15' to permit the length of the strap 12 to be adjusted in accordance with the size of the dog. The opposite ends of the strap 12 are provided with soft leather loops 16 and 17 having openings 18 and 19 therein large enough to receive loosely the forelegs of the dog near the shoulders of the dog. The loops 16 and 17 may be formed of flat leather or other similar material or they may be formed of rope, webbing, tape or other material of circular or other cross section, as may be desired. The shoulder strap 12 is adjusted so that it is loose with respect to the legs and shoulders of the dog to permit free movement of the forelegs of the dog. If, however, tension is exerted on the shoulder strap, as for example by means of the leash 20 which is connected to a ring 21 at about the middle of the shoulder strap 12, the strap 12 will slide back along the body of the dog and the loops will pull against the forelegs of the dog thereby restricting their movement and slowing down or bringing the dog to a stop.

To enable the dog to move on the end of the leash and exert a pull thereon without bringing the restraining action of the shoulder strap 12 into play, a resilient member 22 is provided to connect the collar 10 with the shoulder strap 12. The resilient member 22 may consist of a heavy rubber band 22b, or a length of elastic cord or a coil spring covered with fabric or leather enabling it to stretch. The resilient member 22 may be connected at one end to the ring 21 on the shoulder strap 12 and at its other end to the usual ring 23 on the collar by means of snaps 24 and 25. If desired, the resilient member 22 may be made adjustable in length, for example, by inserting an adjusting strap (not shown) between one end of the resilient band 26 and one of the snaps 24 or 25.

The resistance to stretching of the resilient member 22 preferably is selected so that it is not appreciably stretched by a pull of about 1 or 2 lbs. Therefore, when a light pull or strain is exerted by the dog on the leash 20, the resilient member 22 will not stretch and the shoulder strap cannot be displaced to the rear to tighten it because the resilient member 22 holds the shoulder member against rearward movement with respect to the collar 10. If, however, the dog pulls harder, the resilient member 22 will stretch, and, as a result, the loops 16 and 17 will be drawn back against the forelegs of the dog to hamper his movement so that he will stop or slow down, thereby relieving the strain on the leash.

Inasmuch as shoulder strap 12 is maintained rather loose to avoid hampering of the dog's movements and chafing, the loops 16 and 17 have a tendency to drop down on the forelegs an inch or two when the dog sits or lies down. This extra slack may be sufficient in some cases to let the dog work his forelegs out of the loops. The slackening of the shoulder strap 12 can be avoided by connecting a piece of weak elastic material 27 or a weak spring between spaced apart points in the shoulder strap 12 or by inserting it in the shoulder strap so that the latter will contract when relieved of tension. The elastic material or spring should have only sufficient strength to keep slack out of the shoulder strap without producing binding.

By using the shoulder harness on young dogs or pups, they will quickly learn not to strain at the leash and after a short training period, the shoulder strap can be removed and only the collar used. Older dogs which have acquired the habit of straining at the leash may require a somewhat longer training period with the new harness, but even then the dog can be broken of the habit within a few days and the dog handled very easily thereafter with only the collar and leash.

It will be understood that the harness is susceptible to considerable modification in the materials from which it is made, in the ornamentation thereon, in the details of construction, and in the adjusting means for the strap, the collar and the resilient member 22. Accordingly, the form of the invention disclosed herein should be considered as illustrative and not as limiting the scope of the following claims.

We claim:

1. A dog harness for restricting the pull of a dog against a leash comprising a strap to extend across the shoulders of a dog, loops at opposite ends of said strap to receive the forelegs of the dog loosely, means at about the middle of the shoulder strap to connect a leash to the strap, a collar to extend around the neck of the dog and a resilient member extending from about the middle of the shoulder strap to the collar and connecting them for relative yielding movement whereby a pull of predetermined magnitude exerted by the dog against the leash will stretch the resilient member and draw the loops against the forelegs of the dog to restrict its movement.

2. A dog harness for cooperation with a dog collar to restrict the pull of a dog against a leash, comprising a strap to extend across the shoulders of a dog and having opposite free ends, loops on said free ends of said strap to receive the forelegs of the dog loosely, means to adjust the length of the strap, means at about the middle of the strap to connect a leash to the strap, and a resilient member connected at one end to about the middle of said strap, means at the other end of said resilient member to connect it to said dog collar, said resilient member maintaining said shoulder strap in spaced relation to said collar to retain the shoulder strap in position to allow free movement of the forelegs of the dog when the dog exerts only a light pull on the leash, said resilient member being stretchable to allow the shoulder strap to move away from the collar and tighten said loops against the forelegs of the dog when the dog pulls harder against the leash.

3. A dog harness for cooperation with a dog collar to restrict the pull of a dog against a leash, comprising a strap to extend across the shoulders of a dog and having opposite free ends, loops on said free ends of said strap to receive the forelegs of the dog loosely, means to adjust the length of the strap, resilient means extending along a section of said strap and connected thereto for contracting said strap lengthwise, means at about the middle of the strap to connect a leash to the strap, and a resilient member connected at one end to about the middle of said strap, means at the other end of said resilient member to connect it to said dog collar, said resilient member maintaining said shoulder strap in spaced relation to said collar to retain the shoulder strap in position to allow free movement of the forelegs of the dog when the dog exerts only a light pull on the leash, said resilient member being stretchable to allow the shoulder strap to move away from the collar and tighten said loops against the forelegs of the dog when the dog pulls harder against the leash.

EDWIN S. PATIENCE.
WARREN R. PATIENCE.

References Cited in the file of this patent
UNITED STATES PATENTS

| Number | Name | Date |
|---|---|---|
| 1,685,435 | Philbrick | Sept. 25, 1928 |
| 2,534,727 | Moyle | Dec. 19, 1950 |